United States Patent
Raju

(10) Patent No.: US 9,807,177 B2
(45) Date of Patent: Oct. 31, 2017

(54) SESSION AWARE USB REDIRECTION FOR MULTI-SERVER PUBLISHED APPLICATIONS

(71) Applicant: Dell Products L.P., Round Rock, TX (US)

(72) Inventor: Sriram Kumar Raju, Bangalore (IN)

(73) Assignee: Dell Products L.P., Round Rock, TX (US)

( * ) Notice: Subject to any disclaimer, the term of this patent is extended or adjusted under 35 U.S.C. 154(b) by 202 days.

(21) Appl. No.: 14/885,011

(22) Filed: Oct. 16, 2015

(65) Prior Publication Data

US 2017/0111455 A1   Apr. 20, 2017

(51) Int. Cl.
*H04L 29/08*   (2006.01)

(52) U.S. Cl.
CPC .......... *H04L 67/141* (2013.01); *H04L 67/025* (2013.01); *H04L 67/2804* (2013.01)

(58) Field of Classification Search
CPC . H04L 67/141; H04L 67/2804; H04L 67/025; H04L 29/08846; H04L 67/2814; H04L 67/16; H04L 67/34; H04L 67/14
See application file for complete search history.

(56) References Cited

U.S. PATENT DOCUMENTS

| | | | |
|---|---|---|---|
| 8,010,630 B2 | 8/2011 | Barreto et al. | |
| 8,365,168 B1* | 1/2013 | Kodorkin | G06F 9/45558 718/1 |
| 2010/0070634 A1* | 3/2010 | Ranjan | H04L 63/0869 709/228 |
| 2010/0077019 A1* | 3/2010 | Holk | H04L 67/125 709/203 |
| 2010/0169071 A1* | 7/2010 | Oltuszyk | G06F 13/385 703/24 |
| 2012/0158822 A1* | 6/2012 | Dai | G06F 9/4413 709/203 |
| 2014/0317418 A1* | 10/2014 | Lin | H04L 63/0471 713/190 |
| 2015/0244766 A1* | 8/2015 | Kaushik | H04L 63/105 709/219 |

* cited by examiner

*Primary Examiner* — Abdullahi E Salad
(74) *Attorney, Agent, or Firm* — Baker Botts L.L.P.

(57) ABSTRACT

In certain information handling system (IHS) environments, universal serial bus (USB) devices connected to a client are redirected to a server or other information handling system. Multiple remote sessions may be running on an IHS as well as multiple multi-server published applications within a given remote session. To make the USB devices seamlessly accessible to the user from a given session or application when a switch occurs to a new session or a new application, the USB device may be sent a reset command which acts like a plug-in/plug-out of the USB device. The USB device is then redirected to the new session or the new application. The server is notified of the reset or the re-connection of the USB device to appropriately virtualize the USB device.

20 Claims, 6 Drawing Sheets

SESSION AWARE USB REDIRECTION FOR MULTI-SERVER PUBLISHED APPLICATIONS

TECHNICAL FIELD

This disclosure generally relates to redirection of a universal serial bus (USB) device, and in particular to session aware USB device redirection for multi-server published applications and to redirection of USB devices to local applications running in a remote session.

BACKGROUND

As the value and use of information continues to increase, individuals and businesses seek additional ways to process and store information. One option available to these users is an information handling system or computing system. An information handling system generally processes, compiles, stores, and/or communicates information or data for business, personal, or other purposes thereby allowing users to take advantage of the value of the information. Because technology and information handling needs and requirements vary between different users or applications, information handling systems may vary with respect to the type of information handled; the methods for handling the information; the methods for processing, storing or communicating the information; the amount of information processed, stored, or communicated; and the speed and efficiency with which the information is processed, stored, or communicated. The variations in information handling systems allow for information handling systems to be general or configured for a specific user or specific use such as financial transaction processing, airline reservations, enterprise data storage, or global communications. In addition, information handling systems may include or comprise a variety of hardware and software components that may be configured to process, store, and communicate information and may include one or more computer systems, data storage systems, and networking systems. The software components may comprise one or more modules that contain instructions that when executed perform one or more functions.

The information handling system may include one or more operating systems. An operating system serves many functions, such as controlling access to hardware resources and controlling the execution of application software. Operating systems also provide resources and services to support application software. These resources and services may include a file system, a centralized configuration database (such as the registry found in Microsoft Windows operating systems), a directory service, a graphical user interface, a networking stack, device drivers, and device management software. In some instances, services may be provided by other application software running on the information handling system, such as a database server.

Some information handling systems are designed to interact with other information handling systems over a network connection. In some instances, the information handling systems may share resources over the network. Certain of the networked information handling systems may act as servers, while others act as clients. In such systems, client applications and client devices may be designed so that the majority of the heavily used resources are at a shared information handling system, such as a centralized server. The client devices may have minimal memory, disk storage, and processor power. Use of such client devices may reduce the total cost of ownership because of the reduced use of resources at the client devices and because the clients can be centrally administered and updated from the server. Such client devices may be particularly well-suited for a network which can handle a significant number of devices.

Virtual desktop infrastructure (VDI) environments may include any one or more information handling systems. A virtual environment, such as a VDI, separates a desktop environment and its associated software in a data center or server, from the information handling system that is used to access the desktop environment. A "virtual desktop" may refer to any number of methodologies including server-based computing (SBC) where a number of users share the desktop of a server-based operating system, VDI where each user gets their own virtual machine which typically runs a client operating system, and application virtualization technologies that concentrate more closely on making specific applications available to users with these applications, for example, being hosted on a remote system or streamed to the user's local system. With respect to the virtual desktop technologies described, SBC is often regarded as being appropriate for task/call-center type environments, while VDI is more commonly deployed for knowledge workers who require a higher level of user personalization, and application virtualization technologies may be commonly deployed across SBC, VDI and physical desktop environments to solve business challenges such as legacy application operating system (OS) compatibility.

Remote desktop protocols (RDP) allow a user to connect with multiple desktop sessions from a single client device. However, when a user accesses multiple multi-server applications or multiple remote desktops sessions from a single client (or endpoint), the USB devices redirected at the client may not be seamlessly accessible from an active application or an active remote desktop session if the user moves from the current active application or the current remote desktop session to another application (the new active application) or remote desktop session (the active session). Rather, the user may be required to manually disconnect the redirected USB device from the current active application or the current active remote desktop session and re-connect the redirected USB device to the new active application or new active session.

SUMMARY

In one or more embodiments a method comprises determining at a client that a connection of a universal serial bus (USB) device to the client has occurred. The proxy client is notified of the connection and a request is sent to a server for the connected USB device to be virtualized at the server. The client may also determine whether the USB device is a floating USB device. A first remote session is initiated at the client where the first remote session is identified as the current active remote session. A first application is initiated at the client, wherein the first application is identified as the current active application. The current active mode at the client is determined, where the current active mode comprises at least one of the current active remote session and the current active application. A change is detected in the current active mode, where the current active mode is changed when at least one of the current active remote session is switched to a second remote session and the current active application is switched to a second application. In one embodiment, the first remote session uses a different protocol from the second remote session. In one embodiment the first application is initiated in a different remote session from the second application. The current active mode may be stored as an entry in a table. The current active mode may be determined by querying the operating system of the client. When it is detected that the current active mode has changed, the USB device connected to the client is reset, where the reset may be a soft reset. A notification is sent to the server that that USB device has been reset just as it would when the USB device is first coupled to or connected to the client. The client then redirects the reset USB device to the current active session, the current active application, or any combination thereof as indicated by the current active mode.

In one embodiment, a system comprises a server, one or more processors for processing information of the server, a memory of the server communicatively coupled to the one or more processors, and one or more modules that comprises instructions stored in the memory, the instruction when executed by the one or more processors, operable to perform operations comprising any one or more embodiments of the present disclosure.

In one embodiment, one or more computer-readable non-transitory storage media embodying software is operable when executed by one or more computer system to perform any one or more embodiments of the present disclosure.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DESCRIPTION

Figure 1:
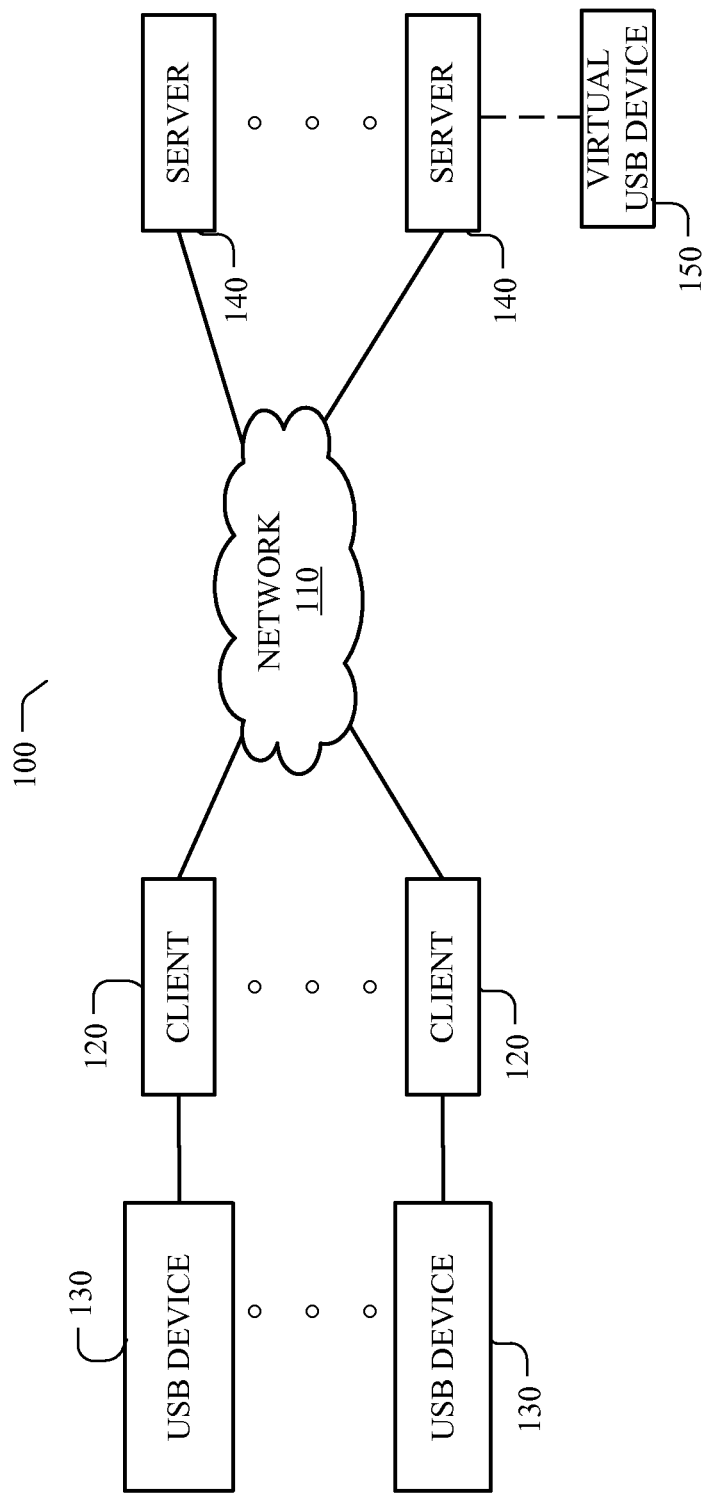
FIG. 1 illustrates an example configuration of networked information handling systems according to one embodiment of the present disclosure.

This disclosure generally relates to remote computing and, in particular, relates to providing session aware universal serial bus (USB) redirection for multi-server published applications. Remote desktop protocols (RDP) may allow redirection of USB devices to one remote desktop session or one multi-server application (virtual application) at a time. When the user switches from a current remote desktop session to a different remote desktop session the user may be required to manually disconnect and re-connect the USB device so that it will be available in the new (or different) remote desktop session. The same is true if the user switches from one virtual application to another virtual application whether within a current active session or in a new active session. The present invention provides an intelligent way to actively monitor the active remote desktop session of a user and to dynamically disconnect the USB device from a current active remote desktop session and redirect the USB device to a different active remote desktop session when the user moves or switches between remote desktop sessions. Likewise, a user may also use multi-server published applications (virtual applications) between different remote desktop sessions and may seek to use the same USB devices between the virtual applications even though the applications may be running in different remote desktop sessions. Dynamically disconnecting and redirecting the USB devices between active remote desktop sessions and between different virtual applications running in multiple remote desktop sessions enables the user to access the redirected USB device in all remote desktop sessions and from all applications seamlessly. The redirected USB device follows the user to whatever remote desktop session and/or application the user has currently active. The applications may be virtual applications For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, read-only memory (ROM), and/or other types of nonvolatile memory. Additional components of the information handling system may include one or more disk drives, one or more network ports for communication with external devices as well as various input and output (I/O) devices, such as a keyboard, a mouse, and a video display. The information handling system may also include one or more buses operable to transmit communications between the various hardware components.

For the purposes of this disclosure, computer-readable storage media may include any instrumentality or aggregation of instrumentalities that may retain data and/or instructions for a period of time. Computer-readable storage media may include, for example without limitation, storage media such as a direct access storage device (for example, a hard disk drive or floppy disk), a sequential access storage device (for example, a tape disk drive), compact disk, compact disk read-only memory (CD-ROM), digital video disc (DVD), random access memory (RAM), ROM, electrically erasable programmable read-only memory (EEPROM), and/or flash memory.

As used herein, a "local" device of a system, or a device "locally" connected to a system, may be a device directly connected to the system using one or more wires or connectors (for example, physically connected to the system), a device indirectly connected to the system using one or more hubs, or a device directly connected to the system using a wireless link. Furthermore, in one aspect of the present disclosure, a local device of a system or a device locally connected to a system may include a device within the system (for example, an internal device).

The present disclosure is now described in detail with reference to a few embodiments thereof as illustrated in the accompanying drawings. In the following description, numerous specific details are set forth in order to provide a thorough understanding of the present disclosure. However, the present disclosure may be practiced without some or all of these specific details. In other instances, well known process steps and/or structures have not been described in detail in order not to unnecessarily obscure the present disclosure. In addition, while the disclosure is described in conjunction with the particular embodiments, it should be understood that this description is not intended to limit the disclosure to the described embodiments. To the contrary, the description is intended to cover alternatives, modifications, and equivalents as may be included within the spirit and scope of the disclosure as defined by the appended claims.

In systems based on the server/client model, certain resources may be shared amongst clients or between clients and servers via a network. For example, in one embodiment the network is a WAN or a LAN. In some circumstances, it may be advantageous to make peripheral devices connected locally at one client device available to one or more other information handling systems on the network.

One type of client information handling system may be a thin client, also known as a lean or slim client. A thin client is a computer or computer program which depends on some other computer, for example, a server, to fulfill at least some of the computational roles required of the thin client. In certain configurations of one or more information handling systems, multiple user may login to the same server. The users may be permitted to work simultaneously even though they may be physically located at separate locations. According to the present disclosure, the users may be permitted to simultaneously access data, applications, and/or hardware associated with the server (or other information handling system). The server itself may be a physical machine or a virtual machine (VM).

A user may access devices redirected to the server as if those devices are available locally to the user by connecting all the necessary peripherals. For example, the user may connect to any number of USB devices such as USB printers, USB scanners, USB mass storage devices, and any other device known to one of ordinary skill in the art.

According to the present disclosure, individual interfaces associated with a single physical device may be installed locally or may be redirected to another information handling device, such as a server. Interfaces forwarded to the server may be mounted as virtual devices at the server and may be shared with additional information handling systems. In some embodiments, one interface associated with a composite device may be redirected to one server, a second interface may be redirected to a second server, and a third interface may be installed locally.

As an example, if a USB device is connected to a given client via a standard USB connection, the locally connected USB device may be redirected to a server. Once the USB device is redirected, the USB device may then be made available for use as a virtualized USB device. The server treats the USB device as a virtual device attached to the server.

FIG. 1 at 100 illustrates an example configuration of a networked information handling system. In particular embodiments, one or more clients 120 and one or more servers 140 are connected via network 110. Many types of peripheral devices may be connected locally to the clients 120. As shown in FIG. 1, in some embodiments, one or more USB devices 130 connect to client 120. According to the present disclosure, one or more USB devices 130 may appear to one or more of servers 140 as if they are locally installed on and connected to those servers 140. In certain embodiments, these USB devices 130 may be redirected such that they appear to be locally installed or locally shared with another client 120. In one embodiment, the Dell Wyse TCX USB Virtualization is used to virtualize the USB device 130. In one or more embodiments, one or more USB devices 130 may be virtualized (a virtual USB device 150) at a server 140.

Figure 2:
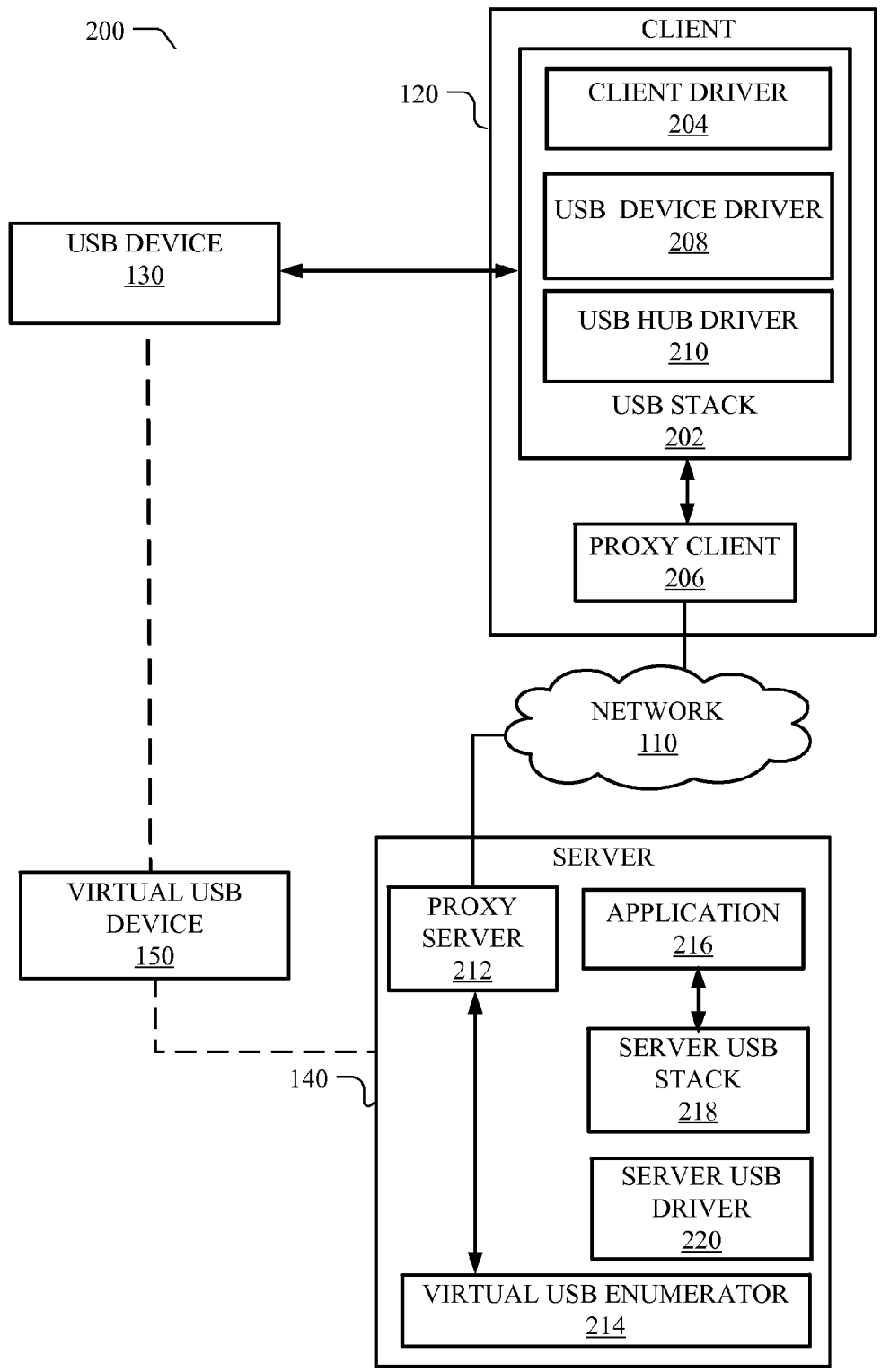
FIG. 2 illustrates an example system of a networked client and server according to one embodiment of the present disclosure.

FIG. 2 at 200 illustrates an example embodiment of a system configured to redirect a USB device 130 and to dynamically re-allocate a redirected USB device 150. In a particular embodiment, the configuration shown in FIG. 2 illustrates a virtual environment that may include one or more of Virtual Desktop Infrastructure (VDI) environment, Server-Based Computing (SBC) environment, and application virtualization technologies. This disclosure contemplates any number of virtual environments as known to one of ordinary skill in the art. As a result of the suitability of these technologies for different user types, many organizations are choosing to implement a hybrid approach that uses each of the technologies including using multiple vendors within each technology. The decision as to which users to allocate to which technology type may be difficult in advance of any actual implementation of a particular technology for a particular user.

Client 120 includes a USB stack 202. USB stack 202 may include a client driver 204, a USB device driver 208 and a USB hub driver 210. The client driver 204 manages the USB device 130. The client driver 204 receives any data from one or more applications 216 directed to the virtual USB device 150. The data passes through the USB device driver 208 and then to the USB hub driver 210 where the USB hub driver 210 may break the data in multiple data transfers for transmission to the USB device 130.

Client 120 recognizes USB device 130, which is connected locally. The client 120 loads the USB device driver 208. The USB device driver 208 monitors the USB device 130. The USB device driver 208 loads the client driver 204. The USB hub driver 210 primarily manages the USB hubs and corresponding ports and enumerates any USB devices connected to these ports. Client 120 may be configured to automatically install all or only certain USB devices 130 locally, may be configured to automatically redirect all or certain USB devices 130 to server 140, or may be configured to request input from a user of client 120 or from another source to determine whether to install a particular USB device 130 or interface locally or to redirect it. Client 120 may be configured to automatically redirect a USB device 130 to an active session or active application. The active application may be an application 216 and may appear to the client 120 as a virtual application. Client 120 may be configured to reset a USB device 130 associated with a current active session or a current active application so that the USB device 130 may be redirected to the new active session or the new active application when the user switches between sessions or applications.

If a USB device 130 is configured to be redirected to server 140, the redirection may operate generally as described in U.S. Pat. No. 8,010,630 to Barreto, et al., which is incorporated herein by reference. In particular embodiments, client 120 connects to server 140 via network 110. Network 110 may be a high latency network. A proxy client 206 on client 120 may coordinate communications between USB device 130 and the proxy server 212 of server 140. In particular, proxy client 206 may be configured to receive socket connection information from proxy server 212 of server 140 and initiate redirecting device transactions to and from USB device 130 to proxy server 212 on server 140.

The USB device 150 may be virtualized at server 140. The proxy server 212 of server 140 loads the virtual USB enumerator 214. Once the virtual USB device 150 is created by the virtual USB enumerator 214, application 216 may be able to access the virtual USB device 150 with the server USB driver 220, while the server USB stack 218 associated with the virtual USB driver 150 processes any requests from application 216. Application 216 may be one or more applications that reside locally at the server 140 or may be one or more virtual applications. The virtual USB enumerator 214 transmits any requests from any application 216 to the proxy server 212. Proxy server 212 then transmits the requests to the proxy client 206. Proxy client 206 communicates with the USB device 130 via the USB stack 202. The operation of the elements of FIG. 2 is further described below with respect to FIG. 3, FIG. 4, FIG. 5 and FIG. 6.

Figure 3:
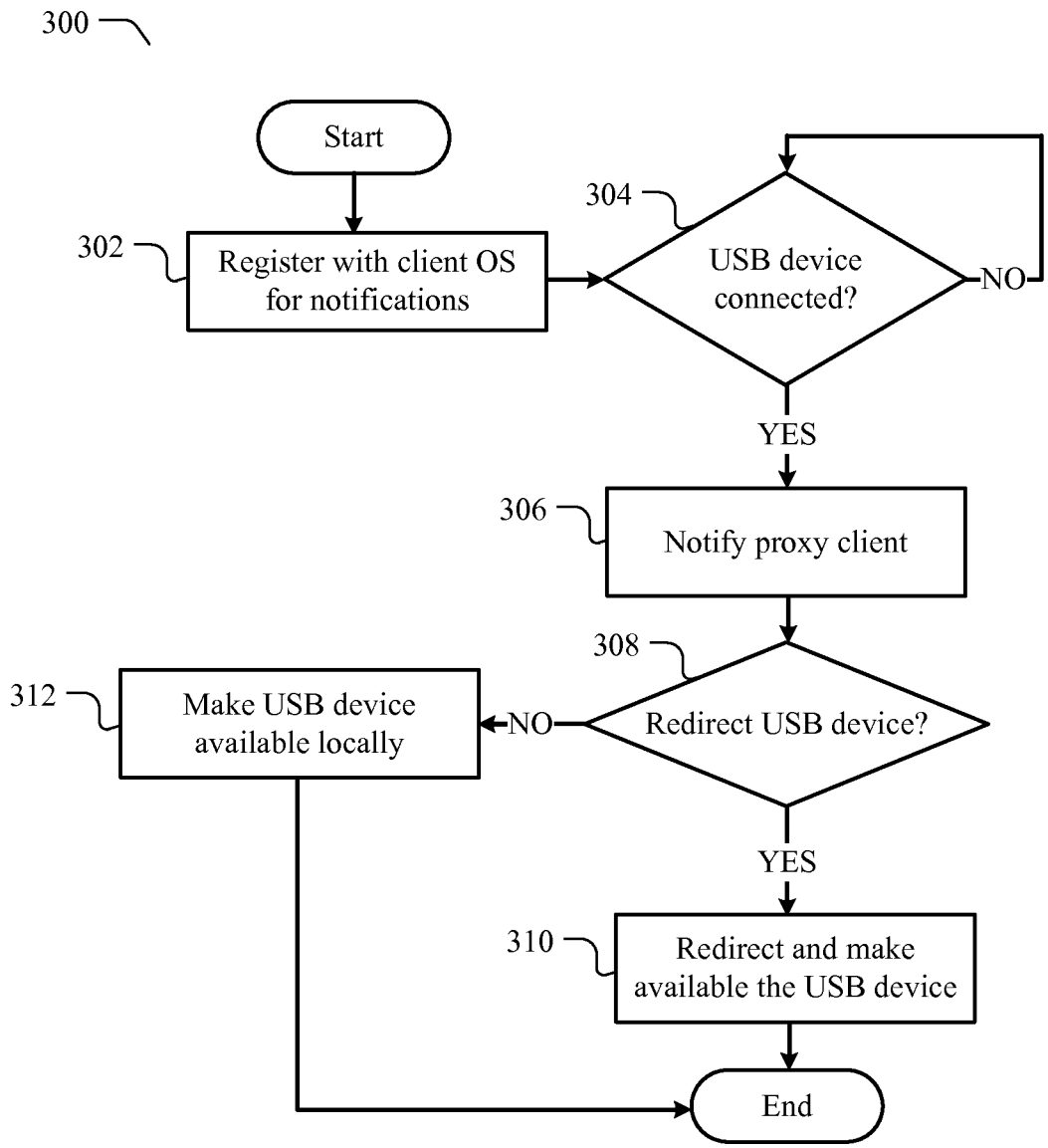
FIG. 3 illustrates an example of steps involved in one method according to one embodiment of the present disclosure.

FIG. 3 is a flow chart in accordance with an embodiment of the present disclosure, shown generally at 300, relating to preparation of the client 120 for redirection of a USB device 130. The proxy client 206 registers with the operating system (OS) at the client 120 at step 302 for USB device 130 arrival notification. At step 304, the client 120, via proxy client 206, polls to determine if a USB device 130 is connected to client 120. Proxy client 206 may determine if a USB device 130 is connected or if a previously connected USB device 130 has been reset which causes the USB device to essentially simulate a plug-in/plug-out (a software simulation of a disconnect/re-connect) by any process known to one of ordinary skill in the art. For example, in one embodiment a user may use a graphical user interface (GUI) to inform the client 120 that a USB device 130 has been connected. In another embodiment, the client 120 may automatically detect without user intervention the connection of a USB device 130. In one embodiment, USB device driver 208 informs an agent of the client 120 that USB device has been connected. USB device 130 may be any known USB device including, but not limited to, a USB thumb drive, a USB hard disk drive, printer, scanner or any other USB storage device known to one of ordinary skill in the art that may be coupled to the client 120 via a USB. Client 120 may poll for a connection in any way known to one of ordinary skill in the art, including, but not limited, waiting on an interrupt, timer, semaphore, etc. that indicates connection of a USB device such as USB device 130.

In one embodiment, the process continues to loop at step 304 until a USB device is connected to client 120. In another embodiment, the process polls to determine if a USB device 130 has been connected at timed intervals. In another embodiment, the process waits for an interrupt to occur that is indicative of a USB device connection. Once the USB device 130 is connected (directly or communicatively) to client 120 or has been reset as discussed above or with respect to FIG. 4 to client 120, or is recognized in any other manner known to one of ordinary skill in the art by the client 120, the OS of the client 120 at step 306 will notify the proxy client 206 with information or parameters associated with USB device 130.

At step 308 it is determined if the USB device 130 should be redirected to or virtualized at the server 140. In one embodiment, redirection of USB device 130 is based, at least in part, on one or more parameters or information received. For example, in one embodiment only USB devices 130 of certain device types may be automatically redirected while others are not. In other embodiments, the determination of whether to redirect USB device 130 may be based, at least in part, on one or more of manufacturer identification, vendor identification, product identification, or any other property or parameter of USB device 130 known to one of ordinary skill in the art.

If the USB device 130 should be redirected then at step 310 the proxy client 206, based, at least in part, on the received information will redirect USB device 130 and will make USB device 130 available to one or more remote sessions, applications, or virtual applications associated with a user at the client 120. The client 120 assigns the USB device 130 to the active remote session or the active application/virtual application such that USB device 130 is accessible by the remote session or the active application/virtual application. When the USB device 130 is moved from one remote session to another, the client 120 may notify the server 140 that a new virtual USB device 150 is available to the new remote session. If the USB device 130 is not redirected, then at step 312 the client 120 will make the USB device 130 available locally to the user or to one or more local applications.

Figure 4:
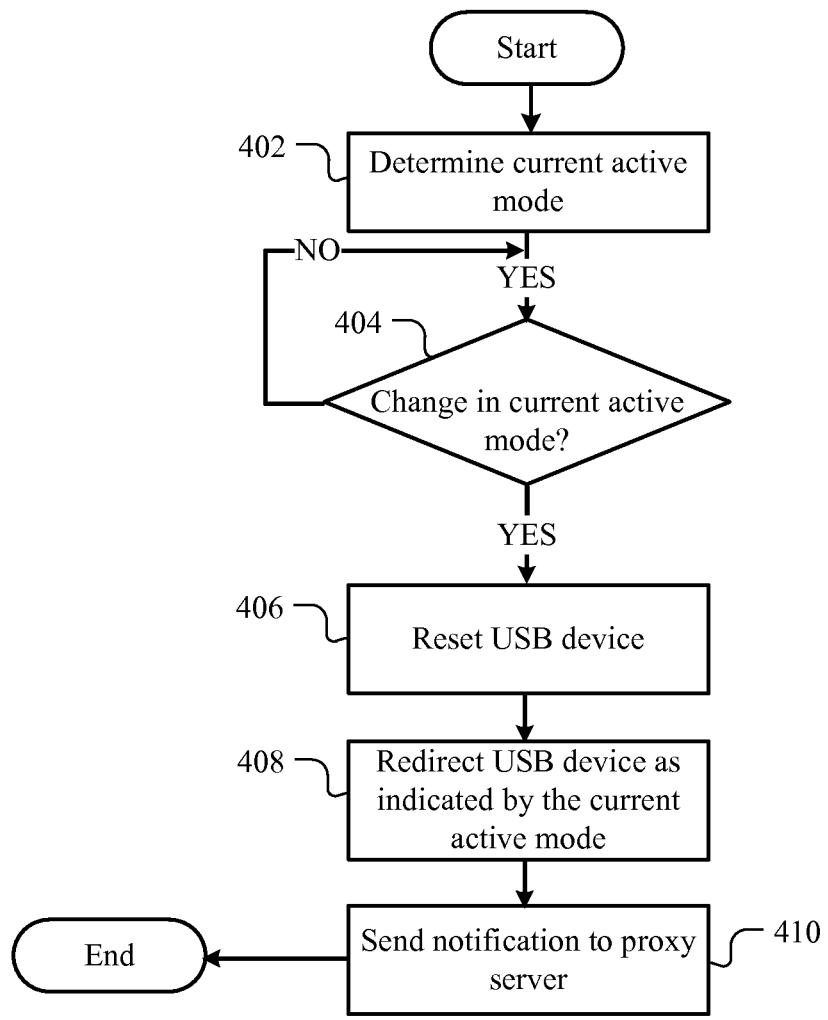
FIG. 4 illustrates an example of steps involved in one method according to one embodiment of the present disclosure.

FIG. 4 is a flow chart in accordance with one embodiment of the present invention shown generally at 400. In one embodiment, one or more remote sessions may be launched or initiated by a user, automatically (for example, by an application (local or virtual)), or any combination thereof and each remote session may utilize any one of a number of different protocols including Microsoft RDP, Citrix Independent Computing Architecture (ICA), VMware Personal Computer over Internet Protocol (PCOIP), Teradici PCOIP, or any other such protocol known to one of ordinary skill in the art. For example, a first remote session may utilize Microsoft RDP and a second remote session may utilize Citrix ICA. A first remote session may be running one or more applications and second remote session may be running one or more different applications. For example, a first session may utilize Microsoft RDP and may be running Microsoft Explorer while a second session may utilize Citrix ICA and may be running a database application.

At step 402, the client 120 determines the current active mode. For example, the current active mode may be indicative of the current active application (or virtual application), the current active session (or remote session), or any combination thereof. In one embodiment, a table at the client 120 stored in a memory 604 or storage 604 (as described with respect to FIG. 6) may include an entry for each session initiated at the client 120 and any associated applications. The table may also indicate a current active mode of the client 120. When a switch occurs from the current active mode (a switch from the current active session to a new active session, a switch from a current active application to a new active application or any combination thereof) the table may be updated. In one or more embodiments, an agent running at the client 120 may create and update the table. The table may be a linked list, a database, a flat-file or any other type of stored data known to one of ordinary skill in the art.

At step 404, the client 120 polls to determine if a change has occurred in the current active mode or monitors the current active mode to determine if a change has occurred. In one embodiment, a change in the current active mode may be determined when the current active application is switched to a new active application. In one embodiment, the current active application may be switched to a new active application within the current active session (the current active session remains the same, only the current active application changes). In another embodiment, the current active application is switched to a new active application running in a new active session. In another embodiment, a change may be determined when the current session is switched to a new session. In one or more embodiments, one or more sessions may be initiated at client 120. In one or more embodiments, one or more applications may be running in any one or more of the one or more sessions. A session or an application may be initiated by a user, automatically (for example, by an application (local or virtual)), any combination thereof, or any other way known to one of ordinary skill in the art. A switch to a new active session or a new active application may be initiated by a user, automatically (for example, by an application (local or virtual)), any combination thereof, or any other way known to one of ordinary skill in the art.

In another embodiment, current keyboard or mouse input (for example, clicks, selections, enter, etc.) may be used to determine if a switch or change has occurred. For example, an agent running at the client 120 may record or otherwise store which session at a client 120 is the current active session (if applicable) and which application (if applicable) is the current active application. The agent may then determine based, at least in part, on a mouse or keyboard input if a switch or change has occurred from a current active session to a new active session or a current active application to a new active application.

In yet another embodiment, the OS of the client 120 may be queried to determine the current active mode (the current active session, the current active application, or both) or the active window may be monitored to detect changes. The client, at step 404, may continuously, upon an interrupt, at a timed interval, or any other way known to one of ordinary skill in the art poll the OS or monitor the active window for the current active mode.

If a change in the current active mode has occurred, at step 406, the client 120 resets the USB device 130. A reset may be a soft reset of the USB device 130 such that it appears to the client 120 that the USB device 130 has gone through a power-off/power-on or plug-out/plug-in sequence even though USB device 130 has remained in a power-on state. In one embodiment, an agent running at the client 120 controls all of the USB devices 130 at client 120 and will send a reset command to the USB device 130. A reset command may operate in the same manner as a plug-out/plug-in of the USB device 130. Upon reset, at step 408 the USB device 130 is redirected to the current active mode. For example, the USB device 130 is redirected to the new active session (replacing the current active session) or the new active application (replacing the current active application) as discussed with respect to FIG. 3 at step 310 when discussing making the USB device 130 available to one or more remote sessions, applications, or virtual applications or any combination thereof associated with a user at the client 120. In one embodiment, step 408 may first determine if the USB device 130 is a floating device such that USB device 130 may be redirected from the current active mode to a new active mode (for example, from a current active session or a current active application to a new active session or a new active application or any combination thereof). A parameter associated with the USB device 130 and stored locally at client 120 (for example, in memory 604 or storage 606 as described with respect to FIG. 6) may be indicative of whether the USB device 130 may be used as a floating device. At step 410, a notification is sent to the server 140 via proxy client 206 over network 110 to proxy server 212 indicative of the reset such that the server 140 may appropriately virtualize the reset USB device 130.

Figure 5:
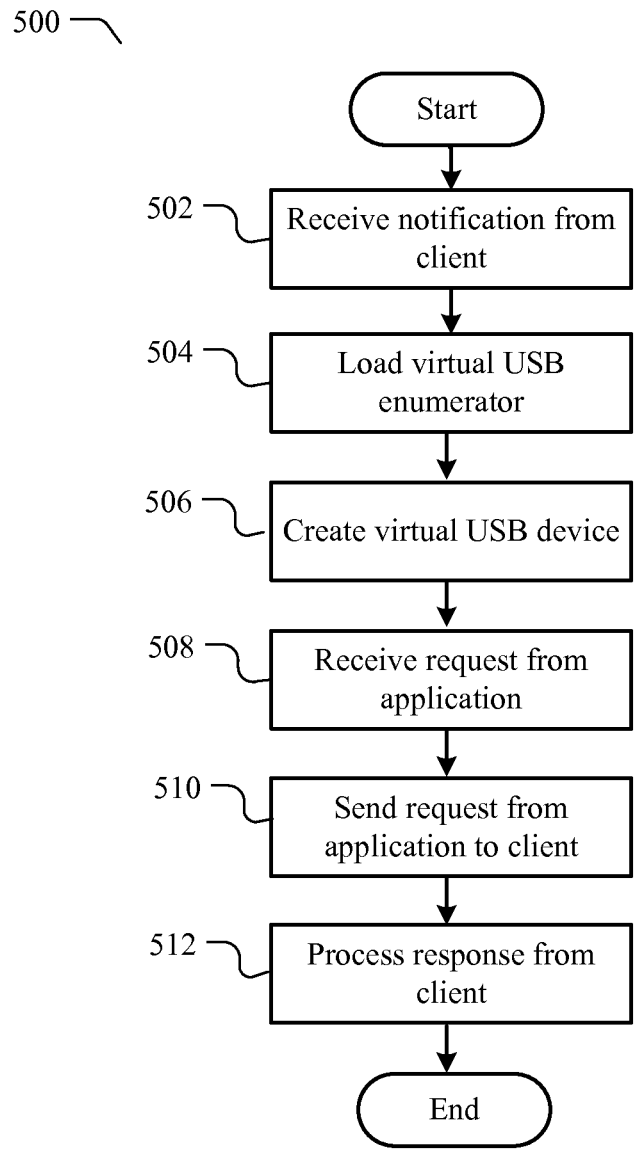
FIG. 5 illustrates an example of steps involved in one method according to one embodiment of the present disclosure.

FIG. 5 illustrates an example of steps at a server 140 for one method according to one embodiment of the present disclosure. At step 502, the server 140 receives a notification from the client 120 that a USB device 130 is ready for virtualization such that it may be accessed from one or more applications 216. The notification is sent from the proxy client 206 to the proxy server 212. At step 504, the proxy server 212 issues a command to the virtual USB enumerator 214 to create the virtual USB device 150. The command may be an input/output control (IOCTL) command or any other such command known to one of ordinary skill in the art. The virtual USB enumerator 214 at step 506 creates the virtual USB device 150 based, at least in part, on any one or more of the properties or parameters of the USB device 130 associated with the notification.

At step 508, a request is received by one or more applications 216 associated with a session at the client 120 to access USB device 150.

At step 510, the request from the application 216 is sent to the client 120 via the proxy server 212 to the proxy client 206. At step 512, the response from the client 120 to the request from the application 216 is processed.

Figure 6:
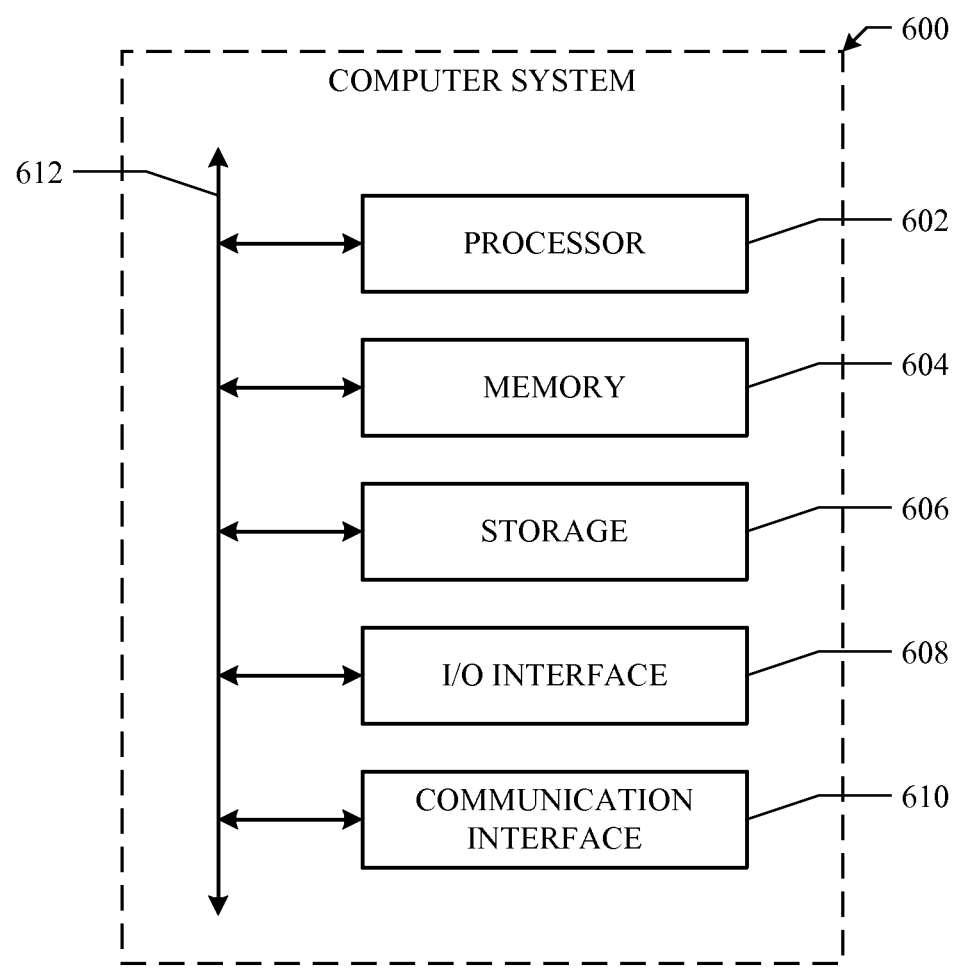
FIG. 6 illustrates an example computing system according to one embodiment of the present disclosure.

Particular embodiments may be implemented on one or more electronic devices or information handling systems. FIG. 6 illustrates an example information handling system, computer system 600. For example, computer system 600 may be an embodiment for a device that runs a user interface content editor. In particular embodiments, one or more computer systems 600 perform one or more steps of one or more methods described or illustrated herein. In particular embodiments, one or more computer systems 600 provide functionality described or illustrated herein. In particular embodiments, software running on one or more computer systems 600 performs one or more steps of one or more methods described or illustrated herein or provides functionality described or illustrated herein. Particular embodiments include one or more portions of one or more computer systems 600.

This disclosure contemplates any suitable number of computer systems 600. This disclosure contemplates computer system 600 taking any suitable physical form. As example and not by way of limitation, computer system 600 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, or a combination of two or more of these. Where appropriate, computer system 600 may include one or more computer systems 600; be unitary or distributed; span multiple locations; span multiple machines; or reside in a cloud, which may include one or more cloud components in one or more networks. Where appropriate, one or more computer systems 600 may perform without substantial spatial or temporal limitation one or more steps of one or more methods described or illustrated herein. As an example and not by way of limitation, one or more computer systems 600 may perform in real time or in batch mode one or more steps of one or more methods described or illustrated herein. One or more computer systems 600 may perform at different times or at different locations one or more steps of one or more methods described or illustrated herein, where appropriate.

In particular embodiments, computer system 600 includes a processor 602, memory 604, storage 606, an I/O interface 608, a communication interface 610, and a bus 612. Although this disclosure describes and illustrates a particular computer system having a particular number of particular components in a particular arrangement, this disclosure contemplates any suitable computer system having any suitable number of any suitable components in any suitable arrangement.

In particular embodiments, processor 602 includes hardware for executing instructions, such as those making up a computer program. The instructions may be part of one or more modules. As an example and not by way of limitation, to execute instructions, processor 602 may retrieve (or fetch) the instructions from an internal register, an internal cache, memory 604, or storage 606; decode and execute them; and then write one or more results to an internal register, an internal cache, memory 604, or storage 606. In particular embodiments, processor 602 may include one or more internal caches for data, instructions, or addresses. This disclosure contemplates processor 602 including any suitable number of any suitable internal caches, where appropriate. As an example and not by way of limitation, processor 602 may include one or more instruction caches, one or more data caches, and one or more translation lookaside buffers (TLBs). Instructions in the instruction caches may be copies of instructions in memory 604 or storage 606, and the instruction caches may speed up retrieval of those instructions by processor 602. Data in the data caches may be copies of data in memory 604 or storage 606 for instructions executing at processor 602 to operate on; the results of previous instructions executed at processor 602 for access by subsequent instructions executing at processor 602 or for writing to memory 604 or storage 606; or other suitable data. The data caches may speed up read or write operations by processor 602. The TLBs may speed up virtual-address translation for processor 602. In particular embodiments, processor 602 may include one or more internal registers for data, instructions, or addresses. This disclosure contemplates processor 602 including any suitable number of any suitable internal registers, where appropriate. Where appropriate, processor 602 may include one or more arithmetic logic units (ALUs); be a multi-core processor; or include one or more processors 602. Although this disclosure describes and illustrates a particular processor, this disclosure contemplates any suitable processor.

In particular embodiments, memory 604 includes main memory for storing instructions for processor 602 to execute or data for processor 602 to operate on. As an example and not by way of limitation, computer system 600 may load instructions from storage 606 or another source (such as, for example, another computer system 600) to memory 604. Processor 602 may then load the instructions from memory 604 to an internal register or internal cache. To execute the instructions, processor 602 may retrieve the instructions from the internal register or internal cache and decode them. During or after execution of the instructions, processor 602 may write one or more results (which may be intermediate or final results) to the internal register or internal cache. Processor 602 may then write one or more of those results to memory 604. In particular embodiments, processor 602 executes only instructions in one or more internal registers or internal caches or in memory 604 (as opposed to storage 606 or elsewhere) and operates only on data in one or more internal registers or internal caches or in memory 604 (as opposed to storage 606 or elsewhere). One or more memory buses (which may each include an address bus and a data bus) may couple processor 602 to memory 604. Bus 612 may include one or more memory buses, as described below. In particular embodiments, one or more memory management units (MMUs) reside between processor 602 and memory 604 and facilitate accesses to memory 604 requested by processor 602. In particular embodiments, memory 604 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 604 may include one or more memories 604, where appropriate. Although this disclosure describes and illustrates particular memory, this disclosure contemplates any suitable memory.

In particular embodiments, storage 606 includes mass storage for data or instructions. As an example and not by way of limitation, storage 606 may include a hard-disk drive (HDD), a floppy disk drive, flash memory, an optical disc, a magneto-optical disc, magnetic tape, or a USB drive or a combination of two or more of these. Storage 606 may include removable or non-removable (or fixed) media, where appropriate. Storage 606 may be internal or external to computer system 600, where appropriate. In particular embodiments, storage 606 is non-volatile, solid-state memory. In particular embodiments, storage 606 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 606 taking any suitable physical form. Storage 606 may include one or more storage control units facilitating communication between processor 602 and storage 606, where appropriate. Where appropriate, storage 606 may include one or more storages 606. Although this disclosure describes and illustrates particular storage, this disclosure contemplates any suitable storage.

In particular embodiments, I/O interface 608 includes hardware, software, or both providing one or more interfaces for communication between computer system 600 and one or more I/O devices. Computer system 600 may include one or more of these I/O devices, where appropriate. One or more of these I/O devices may enable communication between a person and computer system 600. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 608 for them. Where appropriate, I/O interface 608 may include one or more device or software drivers enabling processor 602 to drive one or more of these I/O devices. I/O interface 608 may include one or more I/O interfaces 608, where appropriate. Although this disclosure describes and illustrates a particular I/O interface, this disclosure contemplates any suitable I/O interface.

In particular embodiments, communication interface 610 includes hardware, software, or both providing one or more interfaces for communication (such as, for example, packet-based communication) between computer system 600 and one or more other computer systems 600 or one or more networks. As an example and not by way of limitation, communication interface 610 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 610 for it. As an example and not by way of limitation, computer system 600 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 600 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 600 may include any suitable communication interface 610 for any of these networks, where appropriate. Communication interface 610 may include one or more communication interfaces 610, where appropriate. Although this disclosure describes and illustrates a particular communication interface, this disclosure contemplates any suitable communication interface.

In particular embodiments, bus 612 includes hardware, software, or both coupling components of computer system 600 to each other. As an example and not by way of limitation, bus 612 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 612 may include one or more buses 612, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Those of skill in the art would appreciate that items such as the various illustrative blocks, modules, elements, components, methods, operations, steps, and algorithms described herein may be implemented as hardware, computer software, or a combination of both.

To illustrate the interchangeability of hardware and software, items such as the various illustrative blocks, modules, elements, components, methods, operations, steps, and algorithms have been described generally in terms of their functionality. Whether such functionality is implemented as hardware or software depends upon the particular application and design constraints imposed on the overall system. Skilled artisans may implement the described functionality in varying ways for each particular application.

In one aspect, "means," a block, a module, an element, a component or a processor may be an item (for example, one or more of blocks, modules, elements, components or processors) for performing one or more functions or operations. In one aspect, such an item may be an apparatus, hardware, or a portion thereof. In one example, an item may have a structure in the form of, for example, an instruction(s) encoded or stored on a machine-readable medium, on another device, or on a portion thereof. An instruction(s) may be software, an application(s), a subroutine(s), or a portion thereof. The instructions(s) may be for performing the function(s) or operation(s). The instruction(s) may be executable by one or more processors to perform the function(s) or operation(s). One or more processors may execute the instruction(s) by, for example, transferring or copying and instructions into an executable memory space and executing the instructions. In one example, an item may be implemented as one or more circuits configured to perform the function(s) or operation(s). A circuit may include one or more circuits and/or logic. A circuit may be analog and/or digital. A circuit may be electrical and/or optical. A circuit may include transistors. In an example, one or more items may be implemented as a processing system (for example, a digital signal processor (DSP), an application specific integrated circuit (ASIC), a field programmable gate array (FPGA), etc.), as a portion(s) of any of the foregoing, or as a combination(s) of any of the foregoing. Those skilled in the art will recognize how to implement the instructions, circuits, and processing systems.

In one aspect of the disclosure, when actions or functions (for example, hooking, modifying, intercepting, redirecting, determining, traversing, obtaining, creating, operating, deleting, removing, receiving, providing, generating, converting, displaying, notifying, accepting, selecting, controlling, transmitting, reporting, sending, or any other action or function) are described as being performed by an item (for example, one or more of blocks, modules, elements, components or processors), it is understood that such actions or functions may be performed, for example, by the item directly. In another example, when an item is described as performing an action, the item may be understood to perform the action indirectly, for example, by facilitating such an action (for example, assisting, allowing, enabling, causing, or providing for, such action to occur; or performing a portion of such an action). For example, determining can refer to facilitating determination, attaching can refer to facilitating attaching, and receiving can refer to facilitating receiving. In one aspect, performing an action may refer to performing a portion of the action (for example, performing a beginning part of the action, performing an end part of the action, or performing a middle portion of the action).

A reference to an element in the singular is not intended to mean "one and only one" unless specifically so stated, but rather "one or more." For example, a client may refer to one or more clients, a server may refer to one or more servers, an operation may refer to one or more operations, and a signal, message, or communication may refer to one or more signals, messages, or communications.

Unless specifically stated otherwise, the term "some" refers to one or more. Pronouns in the masculine (for example, his) include the feminine and neuter gender (for example, her and its) and vice versa. Headings and subheadings, if any, are used for convenience only and do not limit the invention.

A phrase such as an "embodiment" does not imply that such embodiment is essential to the subject technology or that such embodiment applies to all configurations of the subject technology. A disclosure relating to an embodiment may apply to all embodiments, or one or more embodiments. An embodiment may provide one or more examples. A phrase such an embodiment may refer to one or more embodiments and vice versa. A phrase such as a "configuration" does not imply that such configuration is essential to the subject technology or that such configuration applies to all configurations of the subject technology. A disclosure relating to a configuration may apply to all configurations, or one or more configurations. A configuration may provide one or more examples. A phrase such a configuration may refer to one or more configurations and vice versa.

In one aspect, the term "coupled" or the like may refer to being directly coupled. In another aspect, the term "coupled" or the like may refer to being indirectly coupled or communicatively coupled.

Various items may be arranged differently (for example, arranged in a different order, or partitioned in a different way) all without departing from the scope of the subject technology. In one aspect of the disclosure, the elements recited in the accompanying claims may be performed by one or more modules or sub-modules.

It is understood that the specific order or hierarchy of steps, operations or processes disclosed is an illustration of exemplary approaches. Based upon design preferences, it is understood that the specific order or hierarchy of steps, operations or processes may be rearranged. Some of the steps, operations or processes may be performed simultaneously. Some or all of the steps, operations, or processes may be performed automatically, without the intervention of a user. The accompanying method claims, if any, present elements of the various steps, operations or processes in a sample order, and are not meant to be limited to the specific order or hierarchy presented.

The disclosure is provided to enable any person skilled in the art to practice the various aspects described herein. The disclosure provides various examples of the subject technology, and the subject technology is not limited to these examples. Various modifications to these aspects will be readily apparent to those skilled in the art, and the generic principles defined herein may be applied to other aspects.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for." Furthermore, to the extent that the term "include," "have," or the like is used, such term is intended to be inclusive in a manner similar to the term "comprise" as "comprise" is interpreted when employed as a transitional word in a claim.

The Title, Background, Summary, Brief Description of the Drawings and Abstract of the disclosure are hereby incorporated into the disclosure and are provided as illustrative examples of the disclosure, not as restrictive descriptions. It is submitted with the understanding that they will not be used to limit the scope or meaning of the claims. In addition, in the Detailed Description, it can be seen that the description provides illustrative examples and the various features are grouped together in various embodiments for the purpose of streamlining the disclosure. This method of disclosure is not to be interpreted as reflecting an intention that the claimed subject matter requires more features than are expressly recited in each claim. Rather, as the following claims reflect, inventive subject matter lies in less than all features of a single disclosed configuration or operation. The following claims are hereby incorporated into the Detailed Description, with each claim standing on its own as a separately claimed subject matter.

The claims are not intended to be limited to the aspects described herein, but are to be accorded the full scope consistent with the language claims and to encompass all legal equivalents. Notwithstanding, none of the claims are intended to embrace subject matter that fails to satisfy the requirement of 35 U.S.C. §101, 102, or 103, nor should they be interpreted in such a way. Any unintended embracement of such subject matter is hereby disclaimed.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

What is claimed is:

1. A method comprising:
   determining connection of a universal serial bus (USB) device to a client;
   notifying a proxy client of the connection;
   sending a request to a server for the USB device to be virtualized at the server;
   initiating a first remote session, wherein the first remote session is a current active remote session;
   initiating a first application, wherein the first application is a current active application;
   determining a current active mode, wherein the current active mode comprises at least one of the current active remote session and the current active application;
   detecting a change in the current active mode, wherein the current active mode is changed when at least one of the current active remote session is switched to a second remote session and the current active application is switched to a second application;
   resetting a USB device;
   sending a notification of the reset to the server; and
   redirecting the reset USB device as indicated by the current active mode.

2. The method of claim 1, wherein resetting the USB device is soft reset.

3. The method of claim 1, wherein the current active mode is stored as an entry in a table.

4. The method of claim 1, wherein the current active mode is determined by querying the operating system of the client.

5. The method of claim 1, further comprising:
determining if the USB device is a floating device.

6. The method of claim 1, wherein in the first remote session uses a different protocol from the second remote session.

7. The method of claim 1, wherein the first application is initiated in a different remote session from the second application.

8. A system comprising:
a server;
one or more processors for processing information of the server;
a memory of the server communicatively coupled to the one or more processors; and
one or more modules that comprise instructions stored in the memory, the instructions, when executed by the one or more processors, operable to perform operations comprising:
determining connection of a universal serial bus (USB) device to a client;
notifying a proxy client of the connection;
sending a request to a server for the USB device to be virtualized at the server;
initiating a first remote session, wherein the first remote session is a current active remote session;
initiating a first application, wherein the first application is a current active application;
determining a current active mode, wherein the current active mode comprises at least one of the current active remote session and the current active application;
detecting a change in the current active mode, wherein the current active mode is changed when at least one of the current active remote session is switched to a second remote session and the current active application is switched to a second application;
resetting a USB device;
sending a notification of the reset to the server; and
redirecting the reset USB device as indicated by the current active mode.

9. The system of claim 8, wherein resetting the USB device is soft reset.

10. The system of claim 8, wherein the current active mode is stored as an entry in a table.

11. The system of claim 8, wherein the current active mode is determined by querying the operating system of the client.

12. The system of claim 8, wherein the instructions further operable to perform operations comprising:
determining if the USB device is a floating device.

13. The system of claim 8, wherein in the first remote session uses a different protocol from the second remote session.

14. The system of claim 8, wherein the first application is initiated in a different remote session from the second application.

15. One or more computer-readable non-transitory storage media embodying software operable when executed by one or more computer systems to:
determine connection of a universal serial bus (USB) device to a client;
notify a proxy client of the connection;
send a request to a server for the USB device to be virtualized at the server;
initiate a first remote session, wherein the first remote session is a current active remote session;
initiate a first application, wherein the first application is a current active application;
determine a current active mode, wherein the current active mode comprises at least one of the current active remote session and the current active application;
detect a change in the current active mode, wherein the current active mode is changed when at least one of the current active remote session is switched to a second remote session and the current active application is switched to a second application;
reset a USB device;
send a notification of the reset to the server; and
redirect the reset USB device as indicated by the current active mode.

16. The media of claim 15, wherein resetting the USB device is soft reset.

17. The media of claim 15, wherein the current active mode is stored as an entry in a table.

18. The media of claim 15, wherein the current active mode is determined by querying the operating system of the client.

19. The media of claim 15, wherein the wherein the software is further operable when executed to:
determine if the USB device is a floating device.

20. The media of claim 15, wherein in the first remote session uses a different protocol from the second remote session, and wherein the first application is initiated in a different remote session from the second application.

* * * * *